United States Patent [19]

Keltner

[11] Patent Number: 5,168,720
[45] Date of Patent: Dec. 8, 1992

[54] REFRIGERANT RECOVERY SYSTEM WITH FLUSH MODE AND ASSOCIATED FLUSHING ADAPTER APPARATUS

[75] Inventor: Robert L. Keltner, Scurry, Tex.

[73] Assignee: Technical Chemical Company, Dallas, Tex.

[21] Appl. No.: 715,429

[22] Filed: Jun. 14, 1991

Related U.S. Application Data

[63] Continuation-in-part of Ser. No. 588,561, Sep. 26, 1990, Pat. No. 5,117,641.

[51] Int. Cl.⁵ .............................................. F25B 45/00
[52] U.S. Cl. ........................................ 62/292; 62/303; 62/475; 62/85; 285/420; 285/12
[58] Field of Search ................ 62/77, 85, 149, 292, 62/303, 474, 475; 137/557; 285/12, 23, 39, 320, 420, 9.2

[56] References Cited

U.S. PATENT DOCUMENTS

| | | | |
|---|---|---|---|
| 4,261,178 | 4/1981 | Cain | 62/149 |
| 4,285,206 | 8/1981 | Koser | 62/126 |
| 4,363,222 | 12/1982 | Cain | 62/292 |
| 4,364,236 | 12/1982 | Lower et al. | 62/77 |
| 4,441,330 | 4/1984 | Lower et al. | 62/149 |
| 4,476,688 | 10/1984 | Goddard | 62/149 |
| 4,539,817 | 9/1985 | Staggs et al. | 62/149 |
| 4,688,388 | 8/1987 | Lower et al. | 62/126 |
| 4,768,347 | 9/1988 | Manz et al. | 62/149 |
| 4,805,416 | 2/1989 | Manz et al. | 62/292 |
| 4,809,520 | 3/1989 | Manz et al. | 62/292 |
| 4,887,435 | 12/1989 | Anderson, Jr. | 62/85 |
| 4,934,390 | 6/1990 | Sapp | 62/303 |
| 5,010,743 | 4/1991 | Hale | 62/292 |

FOREIGN PATENT DOCUMENTS

1305510 4/1987 U.S.S.R. .

*Primary Examiner*—John Sollecito
*Attorney, Agent, or Firm*—Konneker & Bush

[57] ABSTRACT

A refrigerant recovery system is operative in a recovery mode to recover refrigerant from an air conditioning circuit, and in a cleaning mode to cleanse the recovered refrigerant of impurities therein. In the recovery mode the refrigerant is withdrawn from the air conditioning circuit and flowed through a filter dryer by a compressor which then forces the refrigerant through a condenser into a storage container. In the cleaning mode, liquid refrigerant from within the storage container is continuously flowed through the filter dryer and then back into the storage container. To remove impurities from within the air conditioning circuit, the recovery system is also operative in a closed loop flushing mode in which liquid refrigerant from within the storage container is continuously pumped through a portion of the air conditioning circuit, filtered, and then returned to the storage container without any appreciable quantity of refrigerant being vented to atmosphere during the flushing process. For use in conjunction with its flushing mode of operation, the recovery system is provided with a specially designed flushing adapter kit having removable adapter fittings configured to precisely mate with inlet and outlet fittings of the particular air conditioning circuit to be tested. In another embodiment thereof, the kit is provided with removable adapter fittings of a universal configuration permitting the recovery system to be operatively connected to various types of air conditioning circuits.

9 Claims, 3 Drawing Sheets

REFRIGERANT RECOVERY SYSTEM WITH FLUSH MODE AND ASSOCIATED FLUSHING ADAPTER APPARATUS

CROSS-REFERENCE TO RELATED APPLICATION

This application is a continuation-in-part of U.S. application Ser. No. 588,561 filed on Sep. 26, 1990 and entitled "Refrigerant Recovery System With Flush Mode" now U.S. Pat. No. 5,117,641.

BACKGROUND OF THE INVENTION

1. Field of the Invention

This invention relates in general to devices for recovering refrigerant from air conditioning systems, and in particular to a device which will also flush the air conditioning system of impurities.

2. Description of the Prior Art

Air conditioning systems such as in vehicles utilize a refrigerant that scientists believe is harmful to the Earth's atmosphere. In the past, when working on an air conditioning system, often the worker would vent the existing refrigerant to atmosphere. Now, these environmental concerns and resulting regulations are requiring many workers to recover the refrigerant, clean it and reuse it.

Prior art refrigerant recovery systems generally utilize an accumulator for trapping oil and liquid refrigerant, a filter dryer for removing moisture and impurities, and a compressor for compressing the gaseous refrigerant into high pressure gaseous refrigerant. A condenser condenses the gaseous refrigerant into liquid refrigerant, which is then placed into a storage container.

It is also known in the prior art to have a cleaning cycle. In the cleaning cycle, the refrigerant will be recirculated out of the storage container, through the recovery apparatus for further filtering and cleaning, then placed back into the storage container.

While these systems will withdraw and clean refrigerant adequately, often, there will be a need to flush the air conditioning system. Because of the failure in the air conditioning system, there may be metal parts, powders and sludge located in the components of the air conditioning system. In the prior art, the worker will discharge an aerosol flush through the air conditioning system. This aerosol flush also utilizes a refrigerant chemical, however. The aerosol flush would be vented to the atmosphere, which could be harmful.

SUMMARY OF THE INVENTION

The present invention provides improved apparatus for recovering refrigerant from an air conditioning system. In a representative embodiment thereof, the recovery apparatus includes storage container means for receiving refrigerant, filter means for receiving and filtering refrigerant, and recovery means for flowing refrigerant from the air conditioning system, through the filter means and into the storage container means. Cleaning means are provided for cleansing the recovered refrigerant of impurities by sequentially flowing it out of the storage container means, through the filter means and back into the storage container means.

According to a key feature of the present invention, the recovery apparatus is provided with closed loop flushing means which are removably connectable to a pair of air conditioning system inlet and outlet fittings and are selectively operable to withdraw flushing refrigerant from the storage container means, force the withdrawn flushing refrigerant through a portion of the air conditioning system to flush impurities therefrom, and then return the flushing refrigerant to the storage container means without venting any appreciable amount of refrigerant to atmosphere.

In accordance with another aspect of the present invention, adapter means are provided for removably connecting the closed loop flushing means to the air conditioning system inlet and outlet fittings. In one embodiment thereof, the adapter means include a plurality of adapter fittings having first portions removably connectable to flushing conduit portions of the flushing system, and second portions configured to precisely mate with the inlet and outlet fittings in place with the air conditioning system connection fittings temporarily removed therefrom.

These removable adapter fittings may be furnished as a "specific" set which permits the flushing portion of the recovery apparatus to be connected to the various refrigerant inlet and outlet fittings of an air conditioning system made by a particular manufacturer. Alternatively, the adapter fittings may be furnished in a "master" set which includes a relatively large number of adapter fittings each configured to precisely fit a refrigerant flow fitting on a particular brand of air conditioning system.

According to another feature of the present invention, a flushing system adapter fitting is provided with a specially designed "universal" configuration which permits it to be operatively connected to a wide variety of refrigerant flow fittings of the general type having an open outer end, and a transversely enlarged outer side portion positioned inwardly of the open outer end.

In a preferred embodiment thereof, this universal adapter fitting includes a hollow body extending along an axis and having a first end portion operatively and removably connectable to a flushing conduit or hose, and a resilient hollow second end portion insertable plug-like into the open outer end of the refrigerant flow fitting. First and second arm means are pivotally carried on the hollow body for axial movement along its length and have outer end portions positionable inwardly of the transversely enlarged outer side portion of the refrigerant flow fitting on generally opposite sides of the flow fitting. Means are provided for creating relative axial movement between the hollow adapter fitting body and the first and second arm means in a manner releasably locking the outer are means end portions against the transversely enlarged outer side portion of the refrigerant flow fitting and forcibly wedging the resilient second end portion the hollow adapter fitting body into the open end portion the refrigerant flow fitting.

DETAILED DESCRIPTION

Figure 1:
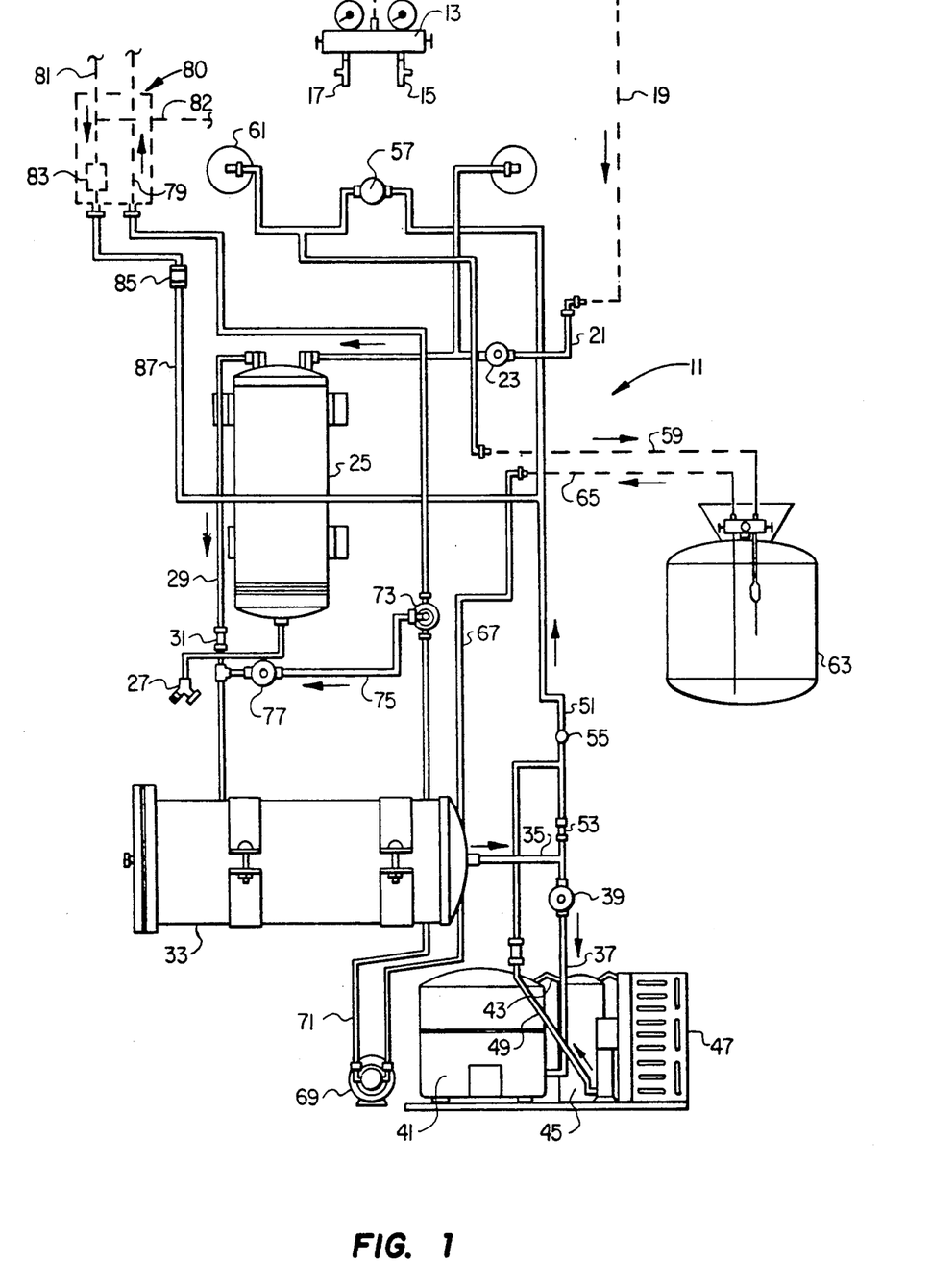
FIG. 1 is a schematic diagram illustrating a recovery apparatus constructed in accordance with this invention.

Referring initially to FIG. 1, recovery apparatus or system 11 may utilize a manifold 13. Manifold 13 has a high side connection 15 and a low side connection 17. The connections 15,17 connect to hoses (not shown) which lead to the high and low sides, respectively, of an air conditioning system (not shown). An intake hose 19 will lead from manifold 13 to an intake line 21 of the recovery apparatus 11.

Intake line 21 has an intake valve 23, which is solenoid actuated to open and close the intake line 21. The refrigerant will flow through the intake line 21, as indicated by the arrow, to an accumulator 25. Accumulator 25 will trap any liquid refrigerant flowing through the intake line 21, as well as trapping oil contained in the air conditioning system. After recovery, an oil drain valve 27 allows the oil to be drained and measured so that the worker will know how much oil was withdrawn from the air conditioning system. Liquid refrigerant contained in the accumulator 25 will boil off into a gas and flow out an accumulator output line 29. An electric heater (not shown) in the accumulator 25 assists in converting liquid refrigerant into gas.

A check valve 31 locates in the accumulator output line 29 to assure flow is only in the direction of the arrow. The accumulator output line 29 leads to a conventional filter dryer 33. Filter dryer 33 will filter the refrigerant of impurities and water moisture. The refrigerant in the filter dryer 33 will be in a gaseous phase. Filter dryer 33 has an output line 35 that leads to a compressor input line 37. A compressor intake valve 39 is solenoid actuated, and will selectively open and close the compressor input line 37. The compressor input line 37 leads to a conventional compressor 41 of a type that will compress a gaseous refrigerant.

Compressor 41 has an output 43 through which high pressure, hot gaseous refrigerant will be discharged. The output 43 leads to an oil separator 45, which is conventional, and may be considered a part of compressor 41. Oil separator 45 will separate oil contained in the refrigerant being discharged from the compressor 41. The oil in the oil separator 45 will be returned to the compressor 41 in a conventional manner.

The oil separator 45 connects to a conventional condenser 47. Condenser 47 is a heat exchanger which will have a fan for flowing through finned tubes. The gaseous refrigerant will be cooled by the condenser 47. This cooling results in the gaseous refrigerant converting into a liquid refrigerant at the output line 49.

The condenser output line 49 connects into a storage input line 51. The filter dryer output line 35 also connects to this storage input line 51 in a "T" connection. One leg of the T connection connects to the compressor input line 37, while the other leg of the T connection connects to the storage input line 51. A check valve 53 in storage input line 51 assures flow only in a direction away from compressor 41.

A high pressure switch 55 will monitor the pressure in the storage input line 51. If it exceeds a maximum set amount, then the high pressure switch 55 will turn off the compressor 41. A conventional sight glass 57 in the storage input line 51 enables a worker to visibly determine if gas bubbles are present within the liquid refrigerant in the storage input line 51. The storage input line 51 has an end which will connect to a storage intake hose 59. A high pressure gauge 61 provides an indication of pressure in the storage input line 51.

The storage intake hose 59 will connect to a storage container 63. Storage container 63 is a tank for receiving the liquid refrigerant from the storage input line 51. Storage container 63 preferably has means (not shown) for indicating when the storage container 63 becomes 80 percent full.

A storage withdrawal hose 65 connects to a fitting which extends to the bottom of the storage container 63. The storage withdrawal hose 65 will connect to a storage withdrawal line 67. Line 67 leads to the input side of a liquid pump 69. Liquid pump 69 is designed for pumping liquids, preferably at a rate of about 58 gallons per hour.

Liquid pump 69 has an output connected to a flush line 71. A clean/flush valve 73 connects into the flush line 71 for allowing fluid to continue passing through the flush line 71, during a flushing mode, or for directing the liquid refrigerant to a recirculation line 75 for a cleaning mode. The recirculation line 75 has a solenoid valve 77 that when actuated will selectively open and close the recirculation line 75. The recirculation line 75 connects to the accumulator output line 29 for recirculating liquid refrigerant back into the filter dryer 33.

The end of the flush line 71 is adapted to be connected to a flush hose 79 which forms a portion of a specially designed flushing adapter kit 80 used to temporarily connect the recovery system 11 to the air conditioning system, for flushing purposes, as subsequently described herein. When in the flush mode, the valve 73 will direct liquid refrigerant to the flush hose 79. The flush hose 79 connects to an input port in the air conditioning system. A return hose 81, also part of the flushing adapter kit 80, connects to an output port in the air conditioning system. This enables the flushing liquid refrigerant to return from the air conditioning system to the return hose 81. Return hose 81 has a recovery branch hose 82 which is adapted to connect to the intake line 21 after flushing and when the manifold line 19 is removed.

A filter 83 connects in the return hose 81 as subsequently described and is operative to filter liquid refrigerant being flushed through the air conditioning system. Filter 83 is much smaller than filter dryer 33, but has a much lower pressure drop. Consequently, liquid refrigerant can be efficiently pumped through the filter 83 at a much higher rate than through filter dryer 33.

A check valve 85 downstream of filter 83 assures that the flow through the return hose 81 will only be in a returning direction. The check valve 85 is located in a return line 87. The return line 87 connects to the storage input line 51. The return line 87 will bypass the accumulator 25, filter dryer 33 and compressor 41.

In the recovery operation, the hose 19 will be connected to the manifold 13. Hoses (not shown) from the high and low side of the air conditioning system will be connected to the high and low side connections 15 and 17, respectively, of the manifold 13. Valves 23 and 39 will be open. Valve 77 will be closed. Pump 69 will not be operating. Compressor 41 will be turned on.

Refrigerant will flow from both the high and low side of the air conditioning system to the recovery apparatus 11. This refrigerant will be a mixture of liquid and gas, and it will flow through the intake hose 19 to the intake line 21. The accumulator 25 will separate oil from the refrigerant. Any liquid components in the refrigerant will be trapped, and will eventually boil off into a gas.

The refrigerant as a gas flows out the accumulator output line 29 and through the filter dryer 33. Moisture and impurities will be filtered by the filter dryer 33. The refrigerant will flow through the compressor input line 37 into compressor 41. Compressor 41 compresses the refrigerant to a high pressure, hot gas.

The high pressure gaseous refrigerant flows through oil separator 45 into condenser 47. Condenser 47 will condense the gaseous refrigerant into a high pressure liquid refrigerant. This refrigerant will flow through the storage input line 51 and the storage intake hose 59 into the storage container 63. The worker will continue withdrawing refrigerant until a selected level of vacuum has been achieved, assuring withdrawal of substantially all of the refrigerant from the air conditioning system.

Then, the worker will clean the refrigerant more thoroughly so that it can be reused or used for flushing. In the cleaning mode, the compressor 41 will be turned off. The valves 23 and 39 will be closed. The valve 73 will be moved to a position to direct refrigerant to recirculation line 75. Valve 77 will be open. Pump 69 will be turned on.

Pump 69 will withdraw liquid refrigerant from the storage container 63, through withdrawal line 67 into the pump 69. The pump 69 pumps the liquid refrigerant out line 71. The valve 73 will direct the liquid refrigerant through line 75 and back in through the filter dryer 33. The filter dryer 33 will further clean the refrigerant. The refrigerant will flow out the filter dryer output line 35 and back into the storage input line 51. The solenoid valve 39 will prevent any of this liquid from flowing into the compressor input line 37. The refrigerant will flow through the storage input line 51 back into the storage container 63. The worker will continue this recirculation process until enough cycles have assured that the refrigerant is completely clean. One specification requires about 15 minutes of recirculation.

Then, the worker may wish to flush the air conditioning system of impurities. The worker will disconnect the hoses leading from the air conditioning system to the manifold connections 15,17. He will connect the flushing adapter kit hoses 79,81 to the same ports in the air conditioning system as subsequently described. He will connect the hose 82 to the intake line 21. The storage container 63 will need a quantity of clean liquid refrigerant that is approximately ten times the volume of the refrigerant recovered from the air conditioning system.

In the flush mode, valves 23 and 39 remain closed. Valve 77 will be closed. Valve 73 will be switched to the other position, blocking flow into the recirculation line 75. Liquid pump 69 will be turned on.

Liquid pump 69 will withdraw liquid refrigerant from the storage container 63. The liquid pump 69 discharges the liquid refrigerant through the flush line 71 into the flush hose 79 and into the air conditioning system. The liquid refrigerant will flow through the air conditioning system, cleaning it of impurities. This liquid refrigerant will return through the return hose 81 to the return line 87.

As the liquid refrigerant flows into the return line 87, it will pass through the filter 83. The filter 83 will separate the impurities collected during the flushing mode. The liquid refrigerant in the return line 87 will flow directly to the storage input line 51 and from there into the storage container 63. In the flushing mode, the filter dryer 33 is bypassed, as well as the accumulator 25 and compressor 41.

After cycling through the flush mode for a selected duration, the worker switches back to the recovery mode. The pump 69 will be turned Off. Valve 77 closes and valves 23 and 39 open. The compressor 41 turns on. The flushing refrigerant will be withdrawn from the air conditioning system through hoses 81 and 82. It will pass through intake line 21, accumulator 25, filter dryer 33, compressor 41, condenser 47 and into the storage container 63 in the manner described above.

The worker will then switch the recovery apparatus 11 back to the clean mode. The filter 83 may not be sufficient to completely clean the flushing refrigerant to specifications. He will repeat the cleaning cycle described above to clean the refrigerant in the storage container 63.

The recovery system 11 has significant advantages. It enables the worker to flush the air conditioning system of impurities with no additional flushing fluid being required. The refrigerant collected can be used also for the flushing. This avoids requiring an aerosol flush, which results in venting of harmful materials to the atmosphere.

THE FLUSHING ADAPTER KIT 80

Figure 2:
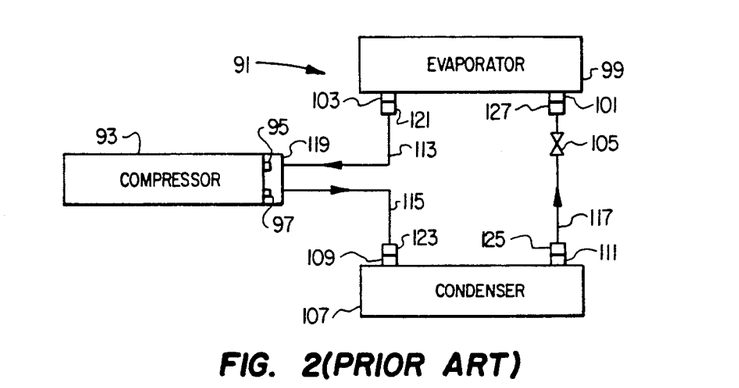
FIG. 2 (Prior Art) is a schematic diagram of a representative conventional air conditioning system with which the recovery apparatus may be utilized.

Schematically illustrated in FIG. 2 (Prior Art) is a representative air conditioning system or circuit 91, of conventional construction, with which the recovery system 11 may be utilized. For purposes of illustration, air conditioning system 91 is shown as being an automotive system, such as those installed in cars and trucks, but could be of another type such those used in residential and commercial buildings. Air conditioning system 91 has a compressor 93 with inlet and outlet fittings 95,97; an evaporator 99 having inlet and outlet fittings 101,103; an expansion valve 105; and a condenser 107 having inlet and outlet fittings 109,111.

These four components of the air conditioning system 91 are operatively interconnected by system conduit means including a conduit 113, a conduit 115, and a conduit 117 in which the expansion valve 105 is removably interposed. First ends of the conduits 113,115 are secured to a block-type connection fitting 119 removably attached to the inlet and outlet fittings 95,97 of compressor 93, and the opposite ends of conduits 113,115 are secured to connection fittings 121,123 removably attached to the evaporator outlet fitting 103 and the condenser inlet fitting 109, respectively. One end of conduit 117 is secured to a connection fitting 125 removably attached to the condenser outlet fitting 111, and the other end of conduit 117 is secured to a connection fitting 127 removably attached to the evaporator inlet fitting 101.

Figure 3:
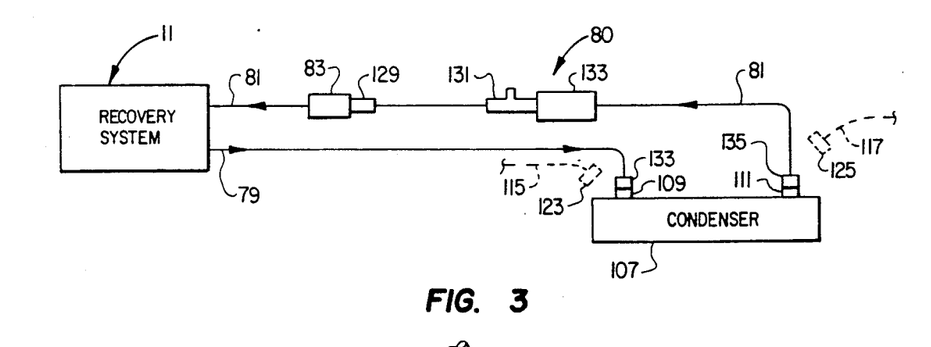
FIG. 3 is a schematic diagram of a flushing adapter kit embodying principles of this invention and being used to representatively connect the recovery apparatus to a condenser portion of the air conditioning system of FIG. 2.

Turning now to FIG. 3, the flushing adapter kit 80 includes the flushing hoses 79 and 81, the filter 83, a sight glass 129, a Schrader tee 131 and a strainer 133. The filter 83, sight glass 129, tee 131 and strainer 133 are removably connected in hose 81 in the arrangement shown in FIG. 3. Specially designed adapter fittings 133,135 are removably secured to the outer or right ends of the flushing hoses 79 and 81, respectively.

To ready the condenser 107 for flushing, the conduit connection fittings 123,125 are respectively removed from the condenser inlet and outlet fittings 109 and 111 (as illustrated in phantom in FIG. 3), and the adapter fittings 133,135 are attached to the fittings 109,111 in place of the removed connection fittings 123,125.

Figure 4:
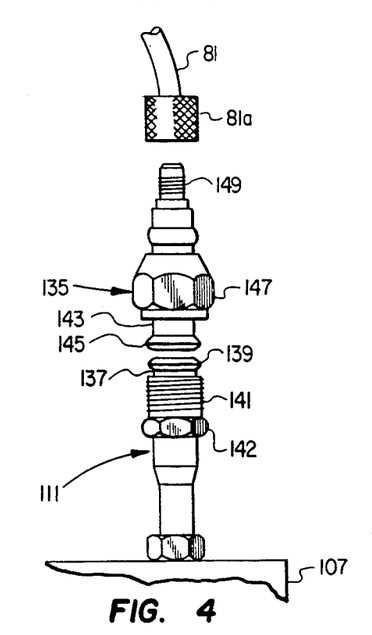
FIG. 4 is an enlarged scale exploded side elevational view of an outer hose end portion of the adapter kit illustrating its connection to the outlet fitting of the condenser using a specially designed removable adapter fitting.

According to a feature of the present invention, the adapter fittings 133,135 are configured to precisely mate with the condenser inlet and outlet fittings on a particular brand of automotive vehicle air conditioning system, or other type of air conditioning system. To this end, the adapter fittings 133,135 are given configurations substantially similar to those of the removed connection fittings 123,125. As an illustration, it will be assumed that the condenser outlet fitting 111 is a male flare fitting portion, as depicted in FIG. 4, having a tubular body portion 137 with a male flare section 139 at its upper end. An externally threaded, hollow tubular fastening stud 141, having a hexagonal head portion 142, is slidably and captively retained on body portion 137.

The illustrated adapter fitting 135 (like its companion adapter fitting 133) is accordingly configured as the female half of a flare fitting, having a tubular body 143 with a female flare section 145 formed on its lower end, and a fastening nut 147 slidably and captively retained on body 143. To connect the adapter fitting 135 to the outlet fitting, the female flare section 145 is placed over the male flare section 139, and the stud and nut 141,147 are tightened together. To removably connect it to its associated flushing hose 81, the adapter fitting 135 is provided at its upper end with a reduced diameter, externally threaded portion 149 which is threadable into a coupler fitting 81$_a$ on the outer end of hose 81.

The adapter fittings 133,135 are thus configured to precisely mate with the inlet and outlet fittings of the air conditioning circuit portion (for example, the condenser) of a particular size, type and/or brand of air conditioning system with which they are to be used in conducting a flushing operation. For differently configured inlet and outlet fittings the adapter fittings can, of course, be configured differently.

Figure 4A:
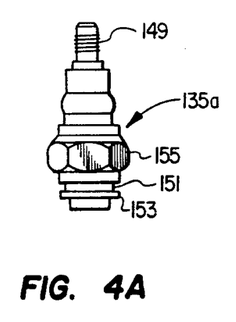
FIGS. 4A and 4B are side elevational views of two representative alternate embodiments of the adapter fitting shown in FIG. 4.

For example, if the representative condenser fitting 111 was configured as the female portion of an O-ring pressure fitting, the alternate adapter fitting 135$_a$ shown in FIG. 4A would be given the general configuration of the complementary male section of such outlet fitting. Specifically, the adapter fitting 135$_a$ has a tubular body 151 with an external sealing flange 153 formed on its lower end, a fastening nut 155 slidably and captively retained on body 151, and the externally threaded upper end portion 149 removably connectable to the coupling fitting 81$_a$ on the flushing hose 81.

Figure 4B:
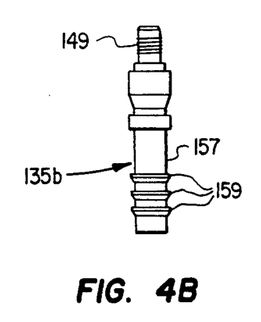

As another example, when necessary, the adapter fitting 135 could be configured as a barb fitting 135$_b$ as illustrated in FIG. 4B, barb fitting 135$_b$ having a tubular body 157 upon which a plurality of external annular barb portions 159 are formed, and the threaded upper end portion 149 for removably connecting the adapter fitting 135$_b$ to the coupler fitting 81$_b$.

Figures 5, 6, 7:
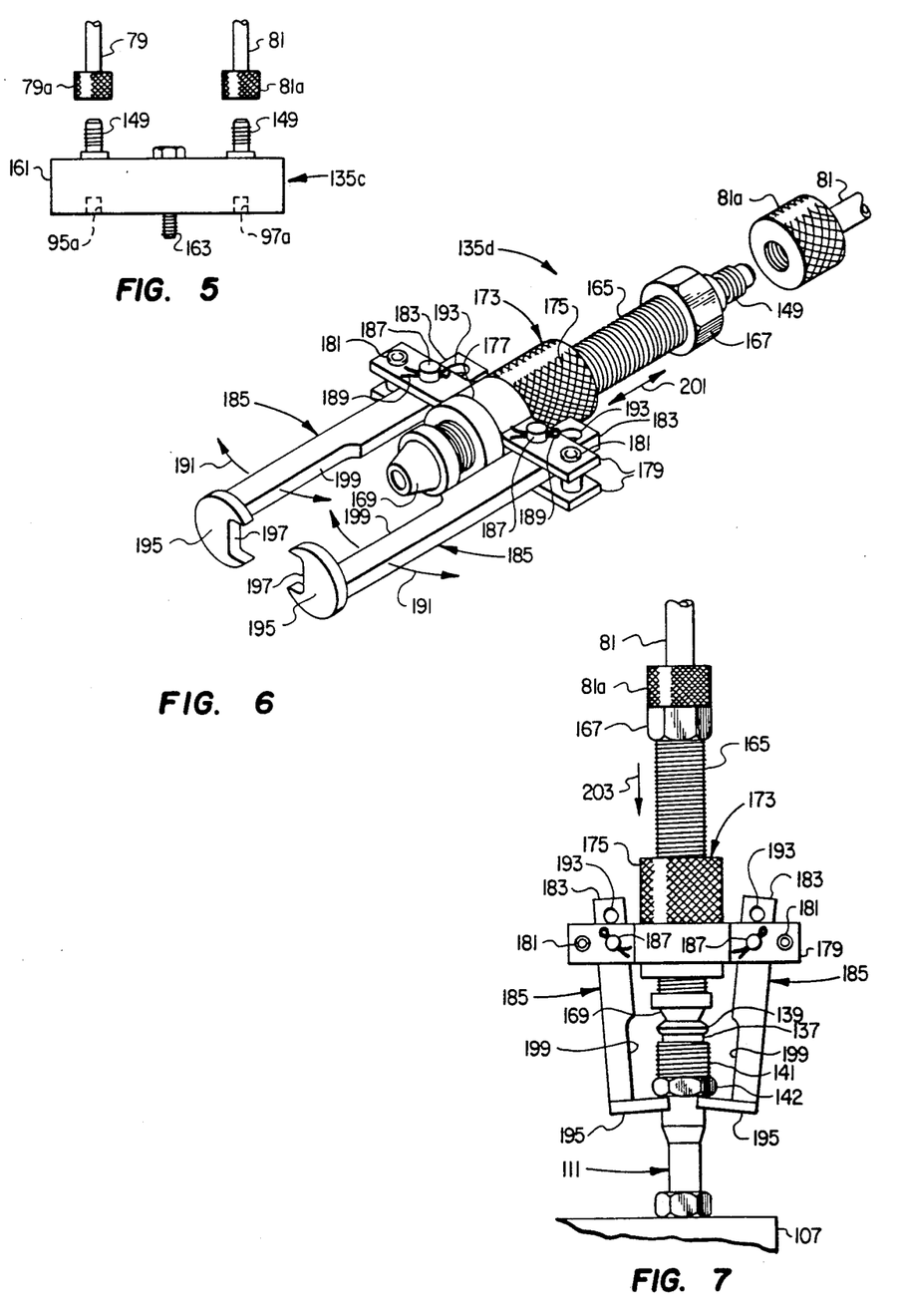
FIG. 5 is a simplified side elevational view of a third alternate embodiment of the adapter fitting.
FIG. 6 is an enlarged scale perspective view of a fourth alternate embodiment of the adapter fitting.
FIG. 7 is a reduced scale side elevational view of the FIG. 6 adapter fitting operatively connected to the outlet fitting of the condenser shown in FIG. 4.

To provide for flushing of the compressor 93 (FIG. 2), a block type adapter fitting 135$_c$ may be provided as illustrated in simplified fashion in FIG. 5. Adapter fitting 135$_c$ has a block-shaped body 161; a pair of openings 95$_a$,97$_a$ on its bottom side for receiving the compressor inlet and outlet fittings 95 and 97; a pair of the externally threaded portions 149 formed on its top side for removably connecting the body 161 to the coupling fittings 79$_a$,81$_a$ of the flushing hoses 79 and 81; and a bolt 163 for operatively securing the body 161 to the compressor.

A variety of removable adapter fittings may be furnished as a portion of the flushing adapter kit 80 schematically depicted in FIG. 3. For example, a "specific" adapter fitting set may be provided to permit the kit to be used in conjunction with the automotive air conditioning systems of a particular car or truck manufacturer, the specific adapter fitting set including a variety of adapter fittings connectable to the compressor, evaporator or condenser portion of the selected type of air conditioning system line.

Alternatively, a "master" set of adapter fittings may be provided to permit flushing connection to the compressor, evaporator or condenser portions of air conditioning systems produced by a selected variety of different manufacturers.

The representative adapter fittings 135, 135$_a$ and 135$_c$ described above have predetermined configurations which permit each of them to be precisely mated with a specific refrigerant fitting on a particular air conditioning system or circuit. The present invention, however, additionally provides an adapter fitting 135$_d$ FIG. 6 which has a "universal" configuration permitting it to be removably connected to a variety of air conditioning circuit inlet and outlet fittings.

Adapter fitting 135$_d$ includes an elongated, externally threaded, hollow tubular body 165 having an enlarged hexagonal right end portion 167. A hollow, generally frustroconically shaped resilient plug fitting 169 is coaxially secured to the left end of the body 165 for purposes later described. To removably connect the adapter fitting 135$_d$ to, for example, the flushing hose 81, an externally threaded, hollow tubular portion 149 (similar to the portions 149 on the adapter fittings previously described herein) projects outwardly from the hexagonal end 167 and is threadably into the hose coupling 81$_a$.

Threaded onto the body 165 is a hollow cylindrical adjustment member 173 having a knurled right end portion 175 immediately adjacent an annular groove 177 formed around the outer side of the adjustment member. The outwardly bent central portions of a pair of elongated bar members 179, extending transversely to the body 165, are slidably received and retained within the groove 177, with facing outer ends of the bars 179 being fixedly secured to one another with hollow rivet members 181.

Right end portions 183 of a pair of leftwardly projecting locking bars 185 are positioned as shown between opposite end portions of the bars 179. The bar end portions 183 are pivotally connected to the bars 179 by a pair of pivot pins 187 extended through aligned circular openings (not shown) in the associated bar ends 179,183 and releasably retained in place by removable cotter pins 189 installed in the opposite ends of each of the pivot pins 187. Pivot pins 187 permit each of the locking bars 185 to pivot relative to the bars 179, about parallel axes transverse to the axis of body 165, as indicated by the double-ended arrows 191 in FIG. 6.

The lengths through which the locking bars 185 leftwardly project beyond the bars 179 may be selectively increased by removing the pivot pins 187, moving bars 185 to the left, and reinstalling the pivot pins through circular holes 193 formed in the right ends of bars 185. For purposes later described, a pair of generally circular locking tab members 195, having recesses 197 formed in facing side edge portions thereof, are transversely secured to the left ends of bars 185 and project laterally inwardly therefrom.

To provide connection clearance for the adapter fitting 135$_d$, facing side edge portions of the bars 185 adjacent the tabs 195 are inset as at 199. As indicated by the double-ended arrow 201 in FIG. 6, by rotating the adjustment member 173 in an appropriate direction relative to the body 165 the member 173 (and thus the bars 179 and 185) may be moved leftwardly or rightwardly along the body 165.

Referring now to FIG. 7, the connection of the universal adapter fitting 135$_d$ to the representative condenser outlet fitting 111 will now be described. To make this connection, the hollow resilient cone plug 169 is inserted into the male flare section 139 of the outlet fitting 111. The locking bars 185 are then pivoted inwardly to position the locking tabs 195 against opposite sides of fitting 111 beneath the stud head 142 which defines a transversely enlarged shoulder portion of the fitting 111.

With the tabs 195 held against the opposite sides of the fitting 111, the adjustment member 173 is rotated to force the fitting body downwardly as indicated by arrow 203. This downward movement of body 165 upwardly draws the tabs 195 firmly against the underside of the stud head 142 and wedges the resilient cone 169 into the fitting section 139, thereby releasably locking the adapter fitting 135$_d$ to the outlet fitting 111 and forming an exterior compression seal between the cone 169 and the fitting section 139.

Adapter fitting 135$_d$ can also be releasably locked and sealed in this manner to a variety of other air conditioning system refrigerant inlet and outlet fittings as well. For example, the tabs 195 can be releasably locked against the attachment stud head portion of an O-ring compression type inlet or outlet fitting, or against one of the annular barb portions of a barb type inlet or outlet fitting, the tab recesses 197 facilitating this locking connection to the typically smaller annular barbs.

The foregoing detailed description is to be clearly understood as being given by way of illustration and example only, the spirit and scope of the present invention being limited solely by the appended claims.

What is claimed is:

1. For use with an air conditioning system having thereon a pair of inlet and outlet fittings for respectively receiving and discharging refrigerant during system operation; and system conduit means for operatively flowing refrigerant through the system, said system conduit means having first and second end portions removably connectable to said inlet and outlet fittings, respectively, using connections secured to said first and second end portions, a recovery system for recovering refrigerant from said air conditioning system, said recovery system comprising:

storage container means for receiving refrigerant;
filter means for receiving and filtering refrigerant;
recovery means for flowing refrigerant from said air conditioning system, through said filter means and into said storage container means; and
closer loop flushing means removably connectable to said pair of air conditioning system inlet and outlet fittings and selectively operable to withdraw flushing refrigerant from said storage container means, force the withdrawn flushing refrigerant through a portion of said air conditioning system to flush impurities therefrom, and then return the flushing refrigerant to said storage container means without venting any appreciable amount or refrigerant to atmosphere, said closed loop flushing means including flushing conduit means having first and second outer end portions through which flushing refrigerant may be respectively discharged and received, and adapter means for respectively connecting said first and second outer end portions of said flushing conduit means to said inlet and outlet fittings on said air conditioning system, said adapter means including:
first hose means for receiving flushing refrigerant discharged from said first outer end portion of said flushing conduit means, said first hose means having a first end removably connectable to said first outer end portion of said flushing conduit means, and a second end,
second hose means for flowing flushing refrigerant into said second outer end portion of said flushing conduit means, said second hose means having a first end removably connectable to said second outer end portion of said flushing conduit means, and a second end, and
adapter fitting means for operably connecting said second ends of said first and second hose means, respectively, to said inlet and outlet fittings on said air conditioning system, said adapter fitting means having a first portion removably connectable to said second ends of said first and second hose means, and a second portion removably connectable to said inlet and outlet fittings on said air condition system in place of said connections normally connected thereto, said adapter fitting means including a plurality of pairs of adapter fittings, each pair of adapter fittings having first end portions removably connectable to the second ends of said first and second hose means, and second end portions configured to precisely mate with inlet and outlet fittings on one of a plurality of air conditioning systems having differently configured inlet and outlet fittings.

2. The recovery system of claim 1 further comprising:
cleaning means for cleaning the recovered refrigerant by repeatedly flowing it from within said storage container means, through said filter means, and back to said storage container means.

3. The recovery system of claim 1 wherein:
said second portion of each of said plurality of adapter fittings is configured substantially similarly to the connection means associated with the air conditioning system fitting to which the adapter fitting is to be operatively secured.

4. For use with an air conditioning system having a pair of inlet and outlet fittings thereon for respectively receiving and discharging refrigerant during system operation; and system conduit means for operatively flowing refrigerant through the system, said system conduit means having first and second end portions removably connectable to said inlet and outlet fittings, respectively, using connection fitting means secured to said first and second end portions, a recovery system for recovering refrigerant from said air conditioning system, said recovery system comprising:

filer dryer means, connectable to said air conditioning system, for receiving refrigerant discharged from said air conditioning system, removing moisture and impurities from the received refrigerant, and then discharging the received refrigerant;

compressor means, connectable to said filter dryer means, for receiving and compressing refrigerant discharged from said filter dryer means and then discharging the compressed refrigerant;

condenser means, connected to said compressor means, for receiving compressed refrigerant discharged from said compressor means, converting the received compressed refrigerant to a liquid refrigerant, and then discharging the liquid refrigerant;

storage container means, connected to said condenser means, for receiving and holding liquid refrigerant discharged from said condenser means; and closed loop flushing means removably connectable to said pair of air conditioning system inlet and outlet fittings and selectively operable to continuously withdraw liquid flushing refrigerant from said storage container means, force the withdrawn refrigerant through a portion of said air conditioning system to flush impurities therefrom, and then return the liquid flushing refrigerant to said storage container means, without venting any appreciable quantity of refrigerant to atmosphere, said closed loop flushing means including:

first and second conduit means through which the liquid flushing refrigerant may be respectively flowed from said storage container means to said air conditioning system, and from said air conditioning system back to said storage container means, said first and second conduit means having outer end portions, and adapter fitting means for operatively connecting said outer end portions of said first and second conduit means to said pair of inlet fittings on said air conditioning system, said adapter fitting means having first portions removably connectable to said outer end portions of said first and second conduit means, and second portions removably connectable to said pair of inlet fittings in place of said connection fitting means, each of said inlet and outlet fittings having a body portion with an open outer end, and a transversely enlarged outer side section positioned inwardly of said open outer end along said body portion, and said adapter fittings including:

an adapter fitting having a hollow body extending along an axis and having a first end portion operatively and removably connectable to the outer end of one of said first and second hose means, a resilient hollow second end portion insertable plug-like into the open outer end of one of said inlet and outlet fittings, first and second arm means having outer end portions positionable inwardly of the transversely enlarged outer side section of said one of said inlet and outlet fittings on generally opposite sides of the fitting, means for supporting said first and second arm means on said hollow body for pivotal movement relative thereto and driven movement along its length, and means for creating relative axial movement between said hollow body and said first and second arm means in a manner releasably locking said outer arm means end portions against the transversely enlarged outer side section of said one of said inlet and outlet fittings and forcibly wedging said resilient second end portion of said hollow body into the open end portion of said one of said inlet and outlet fittings.

5. For use with an air conditioning system having thereon a pair of inlet and outlet fittings for respectively receiving and discharging refrigerant during system operation; and system conduit means for operatively flowing refrigerant through the system, said system conduit means having first and second end portions removably connectable to said inlet and outlet fittings, respectively, using connections secured to said first and second end portions, a recovery system for recovering refrigerant from said air conditioning system, said recovery system comprising:

storage container means for receiving refrigerant;

filter means for receiving and filtering refrigerant;

recovery means for flowing refrigerant from said air conditioning system, through said filter means and into said storage container means; and closer loop flushing means removably connectable to said pair of air conditioning system inlet and outlet fittings and selectively operable to withdraw flushing refrigerant from said storage container means, force the withdrawn flushing refrigerant through a portion of said air conditioning system to flush impurities therefrom, and then return the flushing refrigerant to said storage container means without venting any appreciable amount of refrigerant to atmosphere, said closed loop flushing means including flushing conduit means having first and second outer end portions through which flushing refrigerant may be respectively discharged and received, and adapter means for respectively connecting said first and second outer end portions of said flushing conduit means to said inlet and outlet fittings on said air conditioning system, said adapter means including:

first hose means for receiving flushing refrigerant discharged from said first outer end portion of said flushing conduit means, said first hose means having a first end removably connectable to said first outer end portion of said flushing conduit means, and a second end, second hose means for flowing flushing refrigerant into said second outer end portion of said flushing conduit means, said second hose means having a first end removably connectable to said second outer end portion of said flushing conduit means, and a second end, and adapter fitting means for operably connecting said second ends of said first and second hose means, respectively, to said inlet and outlet fittings on said air conditioning system, said adapter fitting means having a first portion removably connectable to said second ends of said first and second hose means, and a second portion removably connectable to said inlet and outlet fittings on said air condition system in place of said connections normally connected thereto, each of said inlet and outlet fittings having a body portion with an open outer end, and a transversely enlarged outer side section positioned inwardly of said open outer end along said body portion, and said adapter fitting means further including:

an adapter fitting having a hollow body extending along an axis and having a first end portion operatively and removably connectable to the outer end of one of said first and second hose means, a resilient hollow second end portion insertable plug-like into the open outer end of one of said inlet and outlet fittings, first and second arm means having outer end portions positionable inwardly of the transversely enlarged outer side section of said one of said inlet and outlet fittings on generally opposite sides of the fitting, means for supporting said first and second arm means on said hollow body for pivotal movement relative thereto and driven movement along its length, and means for creating relative axial movement between said hollow body and said first and second arm means in a manner releasably locking said outer arm means end portions against the transversely enlarged outer side section of said one of said inlet and outlet fittings and forcibly wedging said resilient second end portion of said hollow body into the open end portion of said one of said inlet and outlet fittings.

6. For use with an air conditioning system having thereon a pair of inlet and outlet fittings for respectively receiving and discharging refrigerant during system operation; and system conduit means for operatively flowing refrigerant through the system, said system conduit means having first and second end portions removably connectable to said inlet and outlet fittings, respectively, using connections secured to said first and second end portions, a recovery system for recovering refrigerant from said air conditioning system, said recovery system comprising:

storage container means for receiving refrigerant;

filter means for receiving and filtering refrigerant;

recovery means for flowing refrigerant from said air conditioning system, through said filter means and into said storage container means; and closer loop flushing means removably connectable to said pair of air conditioning system inlet and outlet fittings and selectively operable to withdraw flushing refrigerant from said storage container means, force the withdrawn flushing refrigerant through a portion of said air conditioning system to flush impurities therefrom, and then return the flushing refrigerant to said storage container means without venting any appreciable amount of refrigerant to atmosphere, said closed loop flushing means including flushing conduit means having first and second outer end portions through which flushing refrigerant may be respectively discharged and received, and adapter means for respectively connecting said first and second outer end portions of said flushing conduit means to said inlet and outlet fittings on said air conditioning system, said adapter means including:

first hose means for receiving flushing refrigerant discharged from said first outer end portion of said flushing conduit means, said first hose means having a first end removably connectable to said first outer end portion of said flushing conduit means, and a second end, second hose means for flowing flushing refrigerant into said second outer end portion of said flushing conduit means, said second hose means having a first end removably connectable to said second outer end portion of said flushing conduit means, and a second end, a filter removably connectable in said second hose means, a strainer removably connectable in said second hose means upstream from said filter, and adapter fitting means for operably connecting said second ends of said first and second hose means, respectively, to said inlet and outlet fittings on said air conditioning system, said adapter fitting means having a first portion removably connectable to said second ends of said first and second hose means, and a second portion removably connectable to said inlet and outlet fittings on said air condition system in place of said connections normally connected thereto.

7. The recovery system of claim 6 wherein said adapter means further include:

a sight glass removably connectable in said second hose means, and a Schrader tee removably connectable in said second hose means.

8. For use with an air conditioning system having a pair of inlet and outlet fittings thereon for respectively receiving and discharging refrigerant during system operation; and system conduit means for operatively flowing refrigerant through the system, said system conduit means having first and second end portions removably connectable to said inlet and outlet fittings, respectively, using connection fitting means secured to said first and second end portions, a recovery system for recovering refrigerant from said air conditioning system, said recovery system comprising:

filter dryer means, connectable to said air conditioning system, for receiving refrigerant discharged from said air conditioning system, removing moisture and impurities from the received refrigerant, and then discharging the received refrigerant;

compressor means, connected to said filter dryer means, for receiving and compressing refrigerant discharged from said filer dryer means and then discharging the compressed refrigerant;

condenser means, connected to said compressor means, for receiving compressed refrigerant discharged from said compressor means, converting the received compressed refrigerant to a liquid refrigerant, and then discharging the liquid refrigerant;

storage container means, connected to said condenser means, for receiving and holding liquid refrigerant discharged from said condenser means; and closed loop flushing means removably connectable to said pair of air conditioning system inlet and outlet fittings and selectively operable to continuously withdraw liquid flushing refrigerant from said storage container means, force the withdrawn refrigerant through a portion of said air conditioning system to flush impurities therefrom, and then return the liquid flushing refrigerant to said storage container means, without venting any appreciable quantity of refrigerant to atmosphere, said closed loop flushing means including:

first and second conduit means through which the liquid flushing refrigerant may be respectively flowed from said storage container means to said air conditioning system, and from said air conditioning system back to said storage container means, said first and second conduit means having outer end portions, and adapter fitting means for operatively connecting said outer end portions of said first and second conduit means to said pair of inlet fittings on said air conditioning system, said adapter fitting means having first portions removably connectable to said outer end portions of said first and second conduit means, and second portions removably connectable to said pair of inlet fittings in place of said connection fitting means, said adapter fitting means further including a plurality of pairs of adapter fittings, each pair of adapter fittings having first end portions removably connectable to the second ends of said first and second conduit means, and second end portions configured to precisely mate with inlet and outlet fittings on one of a plurality of air conditioning system having differently configured inlet and outlet fittings.

9. The recovery system of claim 8 wherein:
said second portion of each of said plurality of adapter fittings is configured substantially similarly to the connection means associated with the air conditioning system fitting to which the adapter fitting is to be operatively secured.

* * * * *

UNITED STATES PATENT AND TRADEMARK OFFICE
CERTIFICATE OF CORRECTION

PATENT NO. : 5,163,720
DATED : December 8, 1992
INVENTOR(S) : Robert L. Keltner

It is certified that error appears in the above-identified patent and that said Letters Patent is hereby corrected as shown below:

Column 11, line 4, "filer" should read --filter--.

Column 14, line 43, "filer" should read --filter--.

Column 16, line 6, "system" should read --systems--.

Signed and Sealed this

Twenty-second Day of February, 1994

Attest:

BRUCE LEHMAN

*Attesting Officer*          *Commissioner of Patents and Trademarks*